Dec. 5, 1950   S. D. RUSSELL   2,532,947
BALER AND VENTING MEANS
Original Filed April 19, 1941

INVENTOR.
Stanley D Russell
BY
Emerson B Donnell
ATTORNEY.

Patented Dec. 5, 1950

2,532,947

UNITED STATES PATENT OFFICE 2,532,947

BALER AND VENTING MEANS

Stanley D. Russell, Racine, Wis., assignor to J. I. Case Company, Racine, Wis., a corporation Original application April 19, 1941, Serial No. 389,396, now Patent No. 2,362,861, dated November 14, 1944. Divided and this application November 11, 1944, Serial No. 563,041

3 Claims. (Cl. 100—19)

The present invention relates to balers and an object thereof is to generally improve the construction and operation of machines of this class. A further object is to provide such a machine of larger capacity, lighter weight and lower cost than similar machines of comparable dimensions heretofore known. A further object is to provide for an increased rate of operation over balers heretofore known.

Figure 1:
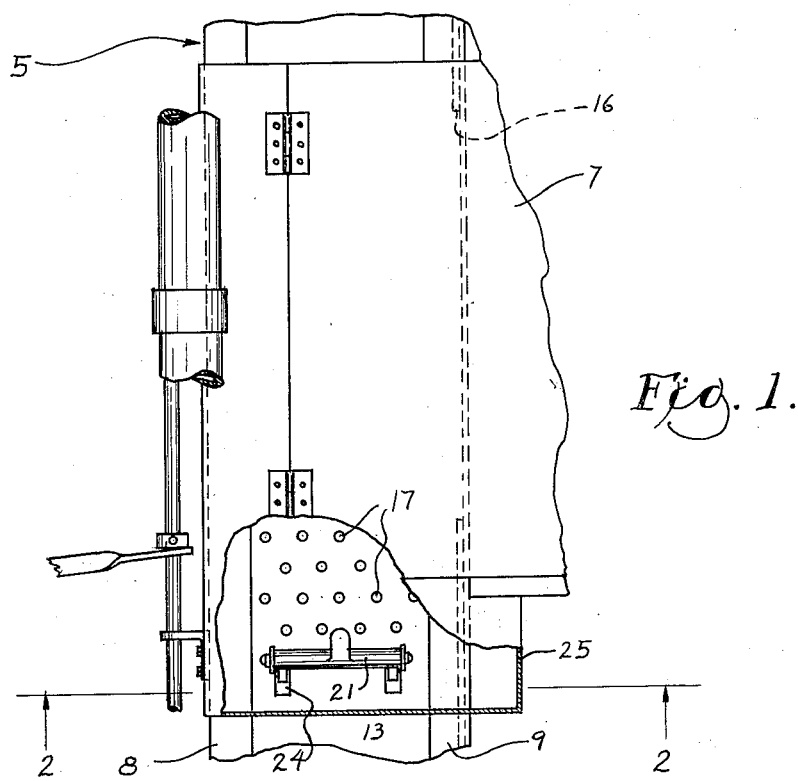

Further objects will be apparent from the following description and accompanying drawings in which Figure 1 is a plan view with parts broken away of so much of a baler as necessary to illustrate the invention.

Figure 2:
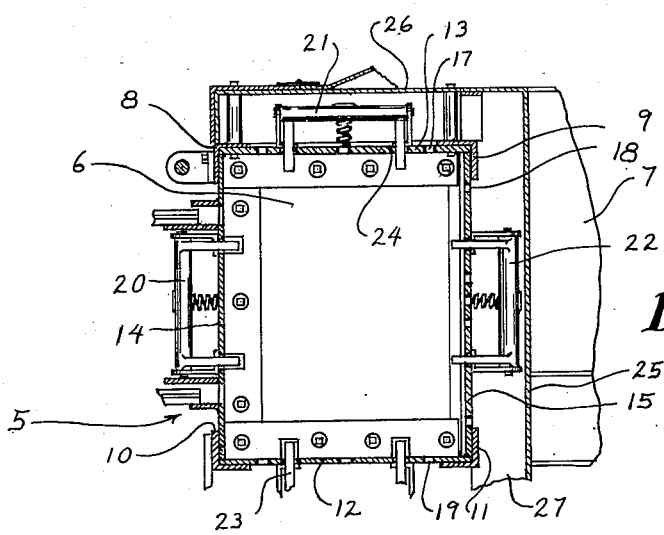

Fig. 2 is a sectional view taken on the line 2—2 of Fig. 1.

Similar reference characters have been applied to the same parts throughout the drawings and specification.

The machine of the present invention is generally similar to that shown and described in pending application, Serial No. 389,396, filed April 19, 1941, and patented November 14, 1944, No. 2,362,861, of which this application is a division.

The portion of the machine illustrated includes a bale chamber generally designated as 5 in which is reciprocable the usual plunger 6, the material to be compressed being introduced into chamber 5 by means of a feeding device 7 of suitable type for example as fully disclosed in the above patent. Plunger 6 is reciprocated within chamber 5 in any suitable or well-known manner but preferably at a considerably faster rate than heretofore, this being accomplished by various expedients fully disclosed in said patent and not necessary to further illustrate for a full understanding of the present invention.

In view of said relatively rapid action of the plunger and also the lack of the large opening in the top of the bale chamber, such as is common in balers heretofore known, an appreciable quantity of air may be trapped in the bale chamber by action of the plunger, resulting in excessive blowing of dust out of the bale chamber and also in some interference with baling. The action also results in needless consumption of power.

Chamber 5 in the present instance is composed of longitudinally arranged angle irons, 8, 9, 10 and 11, which form a rectangular frame work, the bottom being closed by plate 12 and the top by a plate 13. The sides are enclosed respectively by a plate 14 and a plate 15, a suitable opening 16 being provided for entrance of material to be baled in a manner fully disclosed as heretofore noted.

In order to dissipate the air which would otherwise be trapped between plates 12 and 13, 14 and 15, and plunger 6, plates 12, 13 and 15 are provided with numerous openings 17, 18 and 19 which will relieve any air pressure without permitting escape of baled material.

Baling chamber 5 is also provided with retaining dogs 20, 21, 22 and 23 of suitable or well-known construction not necessary to describe further and which have portions extending into the baling chamber through appropriate openings 24. Air also escapes through openings 24 through which the retaining dogs pass. A passageway or flue 25 is provided enclosing openings 18 and a portion 26 extends over and is spaced from openings 17 to collect any air expelled through the latter openings and openings 24. Flue 25 extends downwardly below the baler as at 27. The puff of air with any contained dust resulting from the comparatively rapid compressing stroke of the plunger, is accordingly discharged harmlessly on the ground below the baler. This results in comparatively unobjectionable conditions for the operators who work in the vicinity of the machine. Any dust expelled through openings 19 is already directed toward the ground so that it is not necessary to gather this into flue 27.

The above being a complete description of an illustrative embodiment of the invention, what is claimed as new and desired to be secured by Letters Patent of the United States is:

1. A pressure relieving device for a baler having a baling chamber and a plunger for compressing material to be baled in the chamber, and whereby air may be trapped in the baling chamber in appreciable quantities, said device comprising a plurality of side plates for the baling chamber provided with a plurality of perforations for the escape of air from the chamber, and a permanently open flue enclosing certain of said plates and through which said baling chamber communicates by virtue of the perforations therein with a point removed from the baling chamber.

2. A pressure relieving device for a baler having a baling chamber and a plunger for compressing material to be baled in the chamber, and whereby air may be trapped in the baling chamber in appreciable quantities, said device comprising a plurality of side plates for the baling chamber, dogs operatively supported by the plates, said plates provided with openings through which said dogs project into said chamber, and said plates also providing a plurality of openings for the escape of air from the chamber, and a permanently open flue enclosing certain of said plates and dogs and through which said baling chamber communicates by virtue of all of said openings with a point beneath the baling chamber.

3. A pressure relieving device for a baler having a baling chamber and a plunger for compressing material to be baled in the chamber, and whereby air may be trapped in the baling chamber in appreciable quantities, said device comprising a plurality of side plates for the baling chamber, dogs operatively supported by the plates, said plates being provided with openings through which said dogs project into said chamber, and a permanently open flue enclosing certain of said plates and dogs and through which said baling chamber communicates by virtue of said openings with a point removed from the baling chamber.

STANLEY D. RUSSELL.

REFERENCES CITED

The following references are of record in the file of this patent:

UNITED STATES PATENTS

| Number | Name | Date |
| --- | --- | --- |
| 313,627 | Selz | Mar. 10, 1885 |
| 313,960 | Sherman | May 17, 1885 |
| 969,841 | Cameron | Sept. 13, 1910 |
| 1,285,895 | Armstrong | Nov. 26, 1918 |